United States Patent [19]
Payton et al.

[11] Patent Number: 5,961,783
[45] Date of Patent: Oct. 5, 1999

[54] PROCESS FOR ENHANCING THE STRENGTH AND SIZING PROPERTIES OF CELLULOSIC FIBER USING A SELF-EMULSIFIABLE ISOCYANATE AND A COUPLING AGENT

[75] Inventors: James H. Payton; Jorge F. Miranda; Delos E. Boardman, all of Marietta, Ga.

[73] Assignee: Vinings Industries, Inc., Atlanta, Ga.

[21] Appl. No.: 08/871,097

[22] Filed: Jun. 6, 1997

[51] Int. Cl.⁶ .......................... D21H 17/00; D21H 17/08; D21H 17/28; D21H 17/68
[52] U.S. Cl. .................. 162/158; 162/164.6; 162/168.1; 162/175
[58] Field of Search ..................................... 162/135, 158, 162/164.6, 168.1, 181.6, 181.8, 183, 175

[56] References Cited

U.S. PATENT DOCUMENTS

| | | | |
|---|---|---|---|
| 3,050,437 | 8/1962 | Arlt | 162/158 |
| 3,325,346 | 6/1967 | Osborg | 162/164 |
| 3,589,978 | 6/1971 | Kamal et al. | 162/158 |
| 3,642,571 | 2/1972 | Sprenger | 162/158 |
| 4,317,756 | 3/1982 | Dumas | 524/607 |
| 4,472,550 | 9/1984 | Reif et al. | 524/589 |
| 4,505,778 | 3/1985 | Robertson | 162/135 |
| 4,871,798 | 10/1989 | Dormish et al. | 524/591 |
| 4,904,727 | 2/1990 | Probst et al. | 524/820 |
| 5,015,334 | 5/1991 | Derrick | 162/168.1 |
| 5,407,480 | 4/1995 | Payton et al. | 106/487 |
| 5,503,714 | 4/1996 | Reiners et al. | 162/164.6 |

FOREIGN PATENT DOCUMENTS

| | | |
|---|---|---|
| 915025 | 11/1972 | Canada . |
| 1087825 | 10/1980 | Canada . |
| 2025658 | 9/1990 | Canada . |
| 2093289 | 10/1993 | Canada . |
| 0 065 838 | 12/1982 | European Pat. Off. . |
| 0 564 912 A1 | 10/1993 | European Pat. Off. . |
| 56-057867 | 5/1981 | Japan . |
| 58-087173 | 5/1983 | Japan . |
| 804504 | 11/1958 | United Kingdom . |
| WO 93/07337 | 4/1993 | WIPO . |
| WO 93/18228 | 9/1993 | WIPO . |
| WO 96/38629 | 12/1996 | WIPO . |

*Primary Examiner*—Dean T. Nguyen
*Attorney, Agent, or Firm*—Needle & Rosenberg, P.C.

[57] ABSTRACT

The invention relates to a composition for enhancing the strength or sizing properties of a cellulosic fiber, comprising a) a self-emulsifying isocyanate and b) a coupling agent. The invention also relates to a kit of the composition, a process for enhancing the strength or sizing of a cellulosic fiber, products made from the process, and modified cellulosic fiber.

47 Claims, No Drawings

PROCESS FOR ENHANCING THE STRENGTH AND SIZING PROPERTIES OF CELLULOSIC FIBER USING A SELF-EMULSIFIABLE ISOCYANATE AND A COUPLING AGENT

BACKGROUND OF THE INVENTION

1. Field of the Invention

This invention relates generally to the preparation and application of a self-emulsifiable isocyanate and coupling agent composition to a cellulosic fiber to enhance the strength and sizing properties of the fiber.

2. Background Art

There has been increasing interest in enhancing the physical properties of cellulosic fibers, and in particular paper products. Examples of these physical properties include, but are not limited to, sizing and strength properties. Attempts to enhance the physical properties of cellulosic fibers is known in the prior art. The prior art discloses the treatment of the cellulosic fiber with various chemicals and additives that can improve or enhance the overall physical properties of the fiber.

One such chemical that has demonstrated limited success for enhancing the physical properties of cellulosic fibers is the treatment of these fibers with isocyanates. U.S. Pat. No. 3,050,437 discloses that aliphatic polyisocyanates are used to impart sizing and wet strength to a paper sheet. U.S. Pat. No. 3,325,346 discloses increased strength by treating paper with polyisocyanates in combination with polyethyleneimine.

Two significant problems limit the use of polyisocyanates for the treatment of cellulosic fibers in water borne environments. First, polyisocyanates are insoluble in water. Secondly, polyisocyanates react with chemical additives that have active hydrogen moieties, such as alcohols, amines, phenols and water. When paper or board is manufactured on conventional paper machines, water is the transportation medium that carries the fiber from the pulp generation process, through screening and cleaning to improve fiber quality, and to the paper machine where the fiber is formed into a sheet. Since water comprises 97 to 99.5% of the mixture at a headbox of a paper machine prior to sheet formation, formation of insoluble polyurea derivatives is inevitable as the result of the polyisocyanate reacting with water.

The traditional paper manufacture regime utilizes the following steps: 1) water-borne fibers are carried through a number of fiber processing steps; 2) forming a mat of fiber by draining water from the fiber slurry; and 3) pressing the mat to remove additional water. In order for polyisocyanates to be useful in this process, the invention herein below has found that four conditions must be satisfied. First, the polyisocyanate must be made dispersible in water to insure good distribution in the fiber water matrix prior to sheet formation. Secondly, the polyisocyanate must be protected from water to slow down the formation of polyurea. Thirdly, the protected dispersion of polyisocyanate must be uniformly retained in the paper or board during sheet formation. Finally, the sheet must be dried to remove essentially all of the water and to complete the incorporation and/or reaction of the polyisocyanate and polyurea complex with the bleached or unbleached cellulosic fiber. If all four of these conditions are not satisfactorily addressed, the result will be paper or board with poor strength and sizing properties, deposits in forming fabrics and press felts, and excessive foaming in the sheet forming process.

Useful polyisocyanates are liquids or solids with low melting points. All useful polyisocyanates are insoluble in water and disperse very poorly in water, even when high shear mixing is applied. The large droplet size and the tendency for agglomeration of the droplets leads to poor distribution in the finished paper or board, which prevents uniform strength and sizing properties along the length and breadth of the finished product. U.S. Pat. No. 4,505,778 and Canadian Patent No. 1,087,825 disclose a method for manufacturing cellulosic papers with improved handling and strength properties by using self-emulsifiable isocyanates or an isocyanate terminated prepolymer blend. This produces some improvement in strength and sizing in the water borne process; however, with no protective layer on the dispersion and no retention enhancing mechanism, deposit formation in forming fabrics, press felts, and paper machine equipment made the application impractical. In addition, excessive amounts of foam are generated because of the production of carbon dioxide generated in the formation of polyureas. Canadian Patent No. 915,025 teaches a method for the manufacture of paper or board where polymethylene polyphenyl isocyanate is first emulsified in water by using a surfactant, and then the emulsion is fed to a stock line prior to sheet formation at 2 to 25% of fiber weight to achieve an improvement in strength and sizing. This procedure is also impractical due to deposit formation caused by the lack of a protective and retention mechanism. The presence of the external emulsifier also does not result in enhancing the sizing properties of the fiber.

U.S. Pat. No. 3,050,437 discloses that aliphatic polyisocyanates are used to impart sizing and wet strength in paper. The aliphatic polyisocyanate is dispersed in water using an anionic or nonionic emulsifier prior to the addition to the stock. This is not practical because lack of a retention mechanism can lead to deposit formation. U.S. Pat. No. 3,325,346 discloses increased strength by treating paper with the reaction product of polyethyleneimine (PEI) and an organic polyisocyanate or separate additions of PEI and polyisocyanate. The polyisocyanate is not self-emulsifying, so good distribution in the fiber is problematic, which results in foaming and deposit formation. Since polyethyleneimine has both primary and secondary amine functionality with their active hydrogens, it reacts readily with polyisocyanate. This introduces a cationic site in the newly generated addition product which enhances retention in the fiber during sheet formation. Unfortunately, the reaction with the amine groups consumes the isocyanate functionality, which greatly reduces the bonding potential with the fiber surface since the exposed amine group will only form weak ionic bonds with the fiber.

U.S. Pat. No. 4,871,798 discloses the use of a polyisocyanate reaction product with an aliphatic diol with anionic groups or groups that are capable of being converted to anionic groups. This may enhance dispersibility, but it does not increase retention because the fiber is also anionic. U.S. Pat. No. 4,904,727 discloses the use of a polyurethane compound made by reacting a polyisocyanate with tertiary or quaternary amines to enhance dispersibility or solubility and further reacting the polymer with and acrylic copolymer which is useful for sizing paper. Once again, little if any isocyanate functionality remains to bond with the fiber.

The prior art cited above does not address the three issues of dispersibility, protection of the emulsion, and retention required for successful use in the paper manufacturing process, which results in inferior products and processes.

Other prior art techniques have been developed to avoid the formation of polyurea derivatives when treating cellulosic fibers with polyisocyanate compositions. WO 93/18228 discloses a method of electrostatic spraying of water-free polyisocyanates on the surface of a preformed sheet to enhance strength and sizing. Canadian Patent No. 1,087,825 discloses a method of manufacturing a sheet of building board by first reacting a polyisocyanate with a polyol, emulsifying this reaction product in water, spraying said emulsion on wood chips or other lignocellulosic material, and hot pressing the board to cure the material. U.S. Pat. No. 4,472,550 teaches a method for the emulsification of polyisocyanates in water to act as a binder for molded articles, where the binder is sprayed on cellulosic material to produce board. WO 93/07337 discloses a method of reinforcing paper and paperboard through a surface application of a polyisocyanate to the board, containing from 3 to 15% moisture to form a polyurea coating to strengthen and to provide wet resistance to the board. The polyisocyanate is applied either undiluted or with an organic solvent. Canadian Patent No. 2,025,658 discloses a method for the production of reshapable lignocellulosic materials using polyisocyanates as a binder that is sprayed onto the mixture before heat and pressure is applied to cure the resins.

The prior art cited above illustrates the use of polyisocyanates where 100% retention of the polyisocyanate in the cellulosic substrate is obtained because it is applied at the surface of the lignocellulosic materials. Surface applications (i.e. spraying or coating) are prone to the formation of aerosols, and thus, present significant health hazard concerns. Application of the polyisocyanate in water eliminates this risk; however, as described above, polyisocyanates react with water to produce insoluble polyurea derivatives.

Thus, there is a need for a method of using polyisocyanates during papermaking that will ensure their retention and provide sizing and strength to the sheet and improve the cleanliness of the paper or board forming equipment. In addition, there is a need for a method of applying isocyanates in the absence of deposit formation.

SUMMARY OF THE INVENTION

In accordance with the purpose(s) of this invention, as embodied and broadly described herein, this invention, in one aspect, relates to a composition for enhancing the strength or sizing properties of a cellulosic fiber, comprising:

a) a self-emulsifying isocyanate, and b) a coupling agent.

In yet another embodiment, the invention relates to a kit for enhancing the sizing and strength properties of a cellulosic fiber, comprising:

a) a self-emulsifiable isocyanate, and b) a coupling agent.

In another embodiment, the invention relates to a process for enhancing the strength and sizing properties of a cellulosic fiber comprising contacting the fiber with a) a self-emulsifying isocyanate, and b) a coupling agent.

In yet another embodiment, the invention relates to products made from the process discussed herein.

In yet another embodiment, the invention relates to a cellulosic fiber, wherein the self-emulsifiable isocyanate and coupling agent are incorporated into the cellulosic fiber.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

As used in the specification and in the claims, "a" can mean one or more, depending upon the context in which it is used.

Molecular weights are provided as number average molecular weight unless stated to the contrary.

In accordance with the purpose(s) of this invention, as embodied and broadly described herein, this invention, in one aspect, relates to a composition for enhancing the strength or sizing properties of a cellulosic fiber, comprising:

a) a self-emulsifying isocyanate, and b) a coupling agent.

The isocyanates used to prepare the self-emulsifiable isocyanates are polyisocyanates such as diisocyanates, triisocyanates, etc. or mixtures thereof. The term "polyisocyanate" is defined herein as any compound that has two or more —NCO groups. The term "isocyanate", as used in self-emulsifiable isocyanate, is different from the term "polyisocyanate." The self-emulsifiable isocyanate of the claimed invention has at least one NCO moiety. A self-emulsifiable isocyanate is formed by reacting an isocyanate-reactive compound that imparts surfactant properties to the isocyanate with the polyisocyanates described above.

The polyisocyanates used to prepare the self-emulsifying isocyanates of the present invention can be independently substituted with one or more aromatic, aliphatic, araliphatic, cycloaliphatic, heterocyclic, sulfonyl, carbodiimide, norbornyl, allophanate, isocyanurate, urethane, acylated urea, biuret, ester, acetal, or polymeric fatty acid ester moieties. In a preferred embodiment, the polyisocyanates are substituted with aromatic, aliphatic or cycloaliphatic groups.

Polyisocyanates that are useful in the present invention include but are not limited to diisocyanates, particularly aromatic diisocyanates, and isocyanates of higher functionality, such as triisocyanates, tetraiisocyanates, pentaiisocyanates, etc. Specific examples of polyisocyanates which may be used in the process of the invention include, but are not limited to, hexamethylene diisocyanate; m-phenylene diisocyanate; p-phenylene diisocyanate; tolylene-2,4-diisocyanate; tolylene-2,6-diisocyanate; 4,4'-diphenylmethane-diisocyanate; chlorophenylene-2,4-diisocyanate; naphthylene-1,5-diisocyanate; diphenylene-4, 4'-diisocyanate; 4,4'-diisocyanate-3,3'-dimethyldiphenyl; 3-methyldiphenylmethane-4,4'-diisocyanate; diphenyl ether diisocyanate; cyclohexane-2,4-diisocyanate; cyclohexane-2, 3-diisocyanate; 1-methyl cyclohexyl-2,4-diisocyanate; 1-methyl cyclohexyl-2,6-diisocyanate; bis-(isocyanatocyclohexyl-)methane; 2,4,6- triisocyanatotoluene; 2,4,4'-triisocyanatediphenylether; 1-isocyanato-3,3,5-trimethyl-5-isocyanato-methyl-cyclohexane, 4,4'-diisocyanatodicyclohexyl methane; 4,4'-diisocyanatodicyclohexyl propane-(2,2); 1,4-diisocyanatobenzene; 4,4'-diisocyanatodiphenyl propane-(2,2); p-xylene diisocyanate; $\alpha,\alpha,\alpha',\alpha'$-tetramethyl-m- or p-xylylene diisocyanate or a mixture thereof. In a preferred embodiment, a methylene bridged polyphenyl diisocyanate is used. In an even more preferred embodiment, 4,4'-diphenylmethane diisocyanate is used.

Mixtures of polyisocyanates can be used in the present invention. For example, a mixture of tolylene diisocyanate isomers such as the commercially available mixtures of 2,4- and 2,6-isomers as well as a mixture of di- and higher polyisocyanates produced by phosgenation of aniline/formaldehyde condensates are useful in the present invention. Such mixtures are well-known in the art and include the crude phosgenation products containing mixtures of methylene bridged polyphenyl polyisocyanates, including diisocyanate, triisocyanate and higher polyisocyanates together with any phosgenation by-products. Preferred polyisocyanates useful in the present invention are those wherein the isocyanate is an aromatic diisocyanate or polyisocyanate of higher functionality in crude mixtures of methylene bridged polyphenyl polyisocyanates. The mixture of polyisocyanates are prepared by phosgenation of corresponding mixtures of polyamines obtained by condensation of aniline and formaldehyde. For convenience, crude mixtures of methylene bridged polyphenyl polyisocyanates containing diisocyanate, triisocyanate and higher functionality polyisocyanates are referred to hereinafter as methylene bridged polydiphenyldiisocyanate (MDI).

As previously described, a self-emulsifiable isocyanate is formed by reacting an isocyanate-reactive compound that imparts surfactant properties to the isocyanate with the polyisocyanates described above. The term "isocyanate-reactive compound" of the present invention is defined as any compound that has functional groups that can react with an isocyanate group and has at least one functional group that provides surfactant properties to the isocyanate. Examples of functional groups that can react with isocyanates include but are not limited to alcohols, thiols, thioethers, amines and amides. In one embodiment, the isocyanate-reactive compounds are hydroxyl-ended polyesters or hydroxyl-ended polyethers. In another embodiment, one or more polyols can be used as the isocyanate-reactive compound. The term "polyol" is defined as any compound that has at least two hydroxyl groups. In a preferred embodiment, the polyol can be ethylene glycol, trimethylol propane, butanediol or mixtures thereof. In another embodiment, the polyol is 1,4-butanediol.

In another preferred embodiment, monoalkyl ethers of polyethylene glycols can be used as the isocyanate-reactive compound. These compounds have the formula $R^1O(CH_2CHR^2O)_nH$, wherein $R^1$ and $R^2$ are, independently, an alkyl group of preferably from 1 to 4 carbon atoms and $R^2$ can also be hydrogen. In a preferred embodiment, $R^1$ is methyl, ethyl, propyl or butyl. In an even more preferred embodiment, $R^1$ is methyl. In one embodiment, $R^2$ is hydrogen or branched or straight chain $C_1$–$C_4$. In a preferred embodiment, $R^2$ is hydrogen, methyl or ethyl. In an even more preferred embodiment, $R^2$ is methyl.

In another preferred embodiment, $R^1$ can be a residue of a hydroxy or alkyl terminated polyester which is a condensation product of a diacid with a polyether glycol having a similar number of oxyalkylene groups. The diacids may be aliphatic, cycloaliphatic, aromatic and/or heterocyclic and may be substituted with, for example, halogen atoms, and/or may be unsaturated. Examples include but are not limited to succinic acid, adipic acid, suberic acid, azelaic acid, sebasic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally together with monomeric fatty acids, dimethyl terephthalate, and terephthalic acid-bis-glycol ester. Examples of suitable polyether glycols include but are not limited to ethylene glycol, propylene glycol-(1,2) and -(1,3), butylene glycol-(1,4) and -(2,3) and -(1,3), hexane diol-(1,6), octane diol-(1,8), neopentyl glycol, cyclohexane dimethanol (1,4-bis-hydroxymethyl cyclohexane), 2-methyl-1,3-propane diol, glycerol, trimethylol propane, hexane triol-(1,2,6), butane triol-(1,2,4), trimethylol ethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may contain a proportion of carboxyl end groups. Polyesters of lactones such as e-caprolactone or hydroxycarboxylic acids such as ω-hydroxy-caproic acid may also be used.

There should be sufficient oxyethylene groups $(CH_2CH_2O)$ present in the surface active urethane, which is the reaction product of the polyisocyanate with the isocyanate-reactive group having an alcohol moiety. Preferably, an average of at least 5 oxyethylene groups should be present in the isocyanate-reactive group. It is preferred that n represents an average of from 5 to 120, more preferably from 10 to 25. In an even more preferred embodiment, the molecular weight of the polyether alcohol can be from 300 to 1000, even more preferably from 500 to 750. The alcohols are commercially available; however, they can be made by reacting the appropriate alcohol with either ethylene oxide or propylene oxide, either both of these in sequence or blends of the two in stoichiometric proportions to provide the preferred molecular weight range.

In another embodiment, the isocyanate reactive group can possess anionic or cationic groups or groups that can be converted to anionic or cationic groups. Examples of anionic groups include but are not limited to sulphonate or carboxylate groups. In a further embodiment, the presence of amino groups in the isocyanate reactive group that can be converted to ternary or quaternary ammonium groups are suitable for preparing cationic self-emulsifiable isocyanates. In one embodiment, preparations and examples of cationic and anionic self-emulsifiable isocyanates usable in this invention are disclosed in U.S. Pat. Nos. 4,904,727 to Probst et al. and 4,871,798 to Dormish et al., respectively, and are hereby incorporated by this reference.

The self-emulsifiable isocyanates of the present invention can generally be manufactured by reacting an isocyanate-reactive compound with a polyisocyanate having at least two isocyanate groups. It is preferred that at least one molar portion of polyisocyanate is allowed to react with one molar portion of the isocyanate-reactive compound. In a preferred embodiment, a disclosure of a preferred preparation of self-emulsifiable isocyanates and preferred self-emulsifiable isocyanates usable in the present invention can be found in U.S. Pat. No. 4,505,778, which is hereby incorporated by this reference in its entirety for all of its teachings. A self-emulsifiable isocyanate can also be called an isocyanate terminated prepolymer blend as disclosed in U.S. Pat. No.

4,505,778 to Robertson. Thus, as used herein, self-emulsifiable isocyanates include isocyanate terminated prepolymer blends.

Self-emulsifiable isocyanates that are useful in the present invention can be cationic, anionic or nonionic. In a preferred embodiment, the self-emulsifiable isocyanate is nonionic.

A "self-emulsifying isocyanate" is an isocyanate that has a functional group or moiety that causes the isocyanate to form an emulsion in an aqueous solution without the need for adding an external emulsifier. The functional group or moiety that promotes the formation of the emulsion is nonionic. The functional group that imparts emulsifying properties to the self-emulsifiable isocyanate are not present in non-emulsifiable isocyanates. Examples of non-emulsifiable isocyanates include the diisocyanates described above that are used to prepare the self-emulsifiable isocyanates of the present invention when used alone.

The self-emulsification technique of the present invention is different from prior art techniques that combine an external emulsifier with an isocyanate. An external emulsifier is a surfactant. This external emulsifier is different from and should be distinguished from a coupling agent of the present invention. The coupling agent, herein, facilitates the incorporation of the self-emulsifiable isocyanate into the fiber. Moreover, the amount of external emulsifier required would make control of the process difficult. Furthermore, the paper produced would have some free emulsifier that negatively affects sizing.

The use of a coupling agent in combination with the self-emulsifying isocyanate prevents or minimizes the emulsion from reacting with water and achieves the unexpectedly superior results of this invention. A "coupling agent" is an essentially hydrophilic (i.e. water soluble, water dispersible, water wettable or water loving) material that is capable of coupling with droplets of the self-emulsifiable isocyanate at the water interface. Not wishing to be bound by theory, it is believed that the coupling agent can adsorb or react with the self-emulsifiable isocyanate at the water interface to reduce the reaction between the self-emulsifiable isocyanate and the water. Alternately, it is believed that the coupling agent may be adsorbed or react with the polyurea reaction products with water at the interface to suppress further polyurea formation. This results in decreased deposit formation, which is observed when the self-emulsifiable isocyanates of the present invention are used in combination with the coupling agent. This surface phenomenon requires the coupling agent be large enough to coat and prevent a significant portion of the droplets of the self-emulsifying isocyanate from reacting with water. In addition, the coupling agent may contain both hydrophilic and hydrophobic surfaces. The coupling agents of the present invention enhance retention of the self-emulsifiable isocyanate in the cellulosic fiber during sheet formation.

Examples of coupling agents that are useful in the present invention include but are not limited to the following:

1) Starches are useful as coupling agents to enhance the strength of paper and paperboard. In a preferred embodiment, cationic starches are useful coupling agents of the present invention. Cationic starches are made from naturally occurring starches such as corn, wheat, potatoes, tapioca, or rice. Cationic starches are prepared by adding a cationic monomer to an aqueous starch slurry, heating the slurry to a temperature just below the gelatinization temperature, removing the excess water, and drying. In one embodiment, suitable cationic monomers are 2-dimethylaminoethyl chloride, 2-diethylamino chloride, N-2,3-(epoxy)-propyl diethylamine or mixtures thereof. In another embodiment, potato starch and a cationic quarternized monomer are used to prepare the cationic starch.

Cationic starch is preferred for paper stock addition because it is readily retained on anionic fiber during sheet formation and water removal from the sheet. All starches are expected to act as coupling agents, with cationic starches being most preferred.

2) Natural gums such as guar, locus bean and alginates are useful as coupling agents. Gums that are modified to include a cationic charge are particularly useful.

3) Swelling clays are also useful as a coupling agent in the present invention. In one embodiment, aluminum silicates are used. In another embodiment, smectite-type clays including but not limited to bentonite, montmorillonite, beidellite, montronite, saponite, hectorite and sauconite, or those aforementioned clays converted to their sodium form by well-known methods in the art, can be used. Synthetically prepared smectite-type clays can also be used in the present invention. The swelling clays are available in powders or pourable slurries. In a preferred embodiment, montmorillonite clay slurries such as, for example, PROSORB® A and PROSORB® R sold by Vinings Industries, Atlanta, Ga., USA and disclosed in U.S. Pat. No. 5,407,480, are useful as coupling agents. The use of high solids slurries is also described in U.S. Pat. No. 5,407,480, hereby incorporated by this reference.

Colloidal swelling clays according to the invention comprise layered or three dimensional materials, based on $SiO_4$ tetrahedra, with the layered material being optionally inter-layered with other materials such as alumina and/or magnesia octahedra. Layered materials particularly useful in the practice of this invention are the smectite family of clay minerals that includes montmorillonite. Preferred colloidal swelling clays include sodium bentonite, beidellite, nontronite, saponite and hectorite. Synthetic hectorite materials are also useful coupling agents.

High solids slurries of smectite clays are practical and safe alternatives to using dry powders for this application. Smectite clays are found in geological deposits, which contain crystalline quartz as an impurity. Although crystalline quartz is considered a health hazard as a respirable dust, the use of slurries eliminates this hazard at a paper mill. Examples of high solids smectite clay slurries are PROSORB® A and PROSORB® R supplied by Vinings Industries, which are disclosed in U.S. Pat. No. 5,407,480 hereby incorporated by this reference.

4) Highly charged, low to moderate molecular weight, cationic polymers are commonly used to enhance the retention of fiber, fines and filler minerals in the manufacture of paper and paperboard. The cationic polymers can be homopolymers or copolymers, including terpolymers. Examples include poly(diallyldimethylammonium chloride) and linear or branched reaction products of dimethylamine and epichlorohydrin. Wet strength agents, such as polyamidoamines and polyamidoamides are also cationic polymers that form high strength covalent bonds with fiber after drying and maintain their strength after rewetting.

Suitable cationic monomers are, for example, dialkylaminoalkyl(meth) acrylates or alkyl(meth) acrylamides, either as acid salts or quarternary ammonium salts. The alkyl groups each contain preferably 1 to 4 carbon atoms and the aminoalkyl group preferably contains 1 to 8 carbon atoms. In another embodiment, dialkylaminoethyl (meth)acrylates, dialkylaminomethyl(meth)acrylamides and dialkylamino-1,3-propyl(meth)acrylamides can also be used. The cationic monomer can be polymerized with a nonionic ethylenically unsaturated monomer. A typical preparation of and examples of cationic polymers of one embodiment of this invention are disclosed in U.S. Pat. No. 4,753,710 which is hereby incorporated by this reference.

In one embodiment, the cationic polymers have a molecular weight of from 10,000 to 200,000, preferably 50,000 to 125,000.

5) High molecular weight acrylic polymers are effective as coupling agents. In one embodiment, the molecular weight of the acrylic polymer is from about 100,000 to about 75,000,00, more preferably about 1,000,000 to about 40,000,000.

Homopolymers of acrylamide, methacrylamide, or acrylonitrile or partially hydrolyzed counterparts are particularly useful. These monomers may in addition be copolymerized with acrylic acid, methacrylic acid, or other anionic monomers and used in combination with a low molecular weight, high charge density cationic polymer or an inorganic cationic source, such as alum, to function as a coupling agent. A typical preparation of and examples of high molecular weight acrylic polymers of one embodiment of this invention are disclosed in U.S. Pat. No. 4,753,710 which is hereby incorporated by this reference.

Particularly useful are the copolymers of (meth) acrylamide with cationic monomers, such as dialkylaminoalkyl(meth)acrylates or (meth)acrylamides, either as an acid salt or preferably a quaternary ammonium salt, with alkyl 1 to 4 carbons and alkylamino 1 to 8 carbons. Anionic polyacrylamides are also useful in the present invention when used in combination with alum, polyaluminum chloride or a low to moderate molecular cationic polymer, as previously described.

In another embodiment, the high molecular weight acrylic polymer is a homopolymer or copolymer polymerized from acrylamide, methacrylamide, acrylonitrile, methacrylonitrile, and acrylate or methacrylate esters such as methyl, ethyl, propyl or butyl.

6) Polyamines are useful as coupling agents of the present invention. In one embodiment, the molecular weight of the polyamine is from about 5,000 to about 1,000,000, preferably from about 40,000 to about 1,000,000. In another embodiment, the polyamine is an amine, preferably dimethylamine, and epichlorohydrin condensation polymer, a polyamidoamine, a polyamidoamide or a diallyldialkylammonium chloride polymer.

7) Polyethyleneimines are useful as coupling agents of the present invention. In one embodiment, the molecular weight of the polyethyleneimine is from about 100,000 to about 12,000,000, preferably from about 1,000,000 to about 4,000,000, and even more preferably from about 1,000,000 to about 3,000,000. The large proportion of N—H bonds will make this the fastest reacting coupling agent species toward isocyanates. In one embodiment, the polyethyleneimine is a homopolymer of ethylene imine or a homopolymer of ethylene imine crosslinked with a diamine or a polyamido amine.

8) Nonionic polymers comprising monomeric units of ethylene oxide are also useful as coupling agents in the present invention. In one embodiment, polyethylene oxides (PEO) with a molecular weight from about 10,000 to about 100,000,000 can be used. In a preferred embodiment, the molecular weight is from about 25,000 to about 100,000,000. PEOs of the prior art that react with the isocyanate during manufacturing do not possess chains that are long enough to cause the effects claimed in the invention herein.

In one embodiment, the nonionic polymer is a homopolymer of ethylene oxide. In another embodiment, the nonionic polymer is a copolymer of ethylene oxide and propylene oxide.

9) Colloidal alumina, colloidal silica, and aluminum modified colloidal silica can also be used as coupling agents in the present invention. The colloidal silica particles are layered or three dimensional materials based on $SiO_4$ tetrahedra, with the layered material optionally layered with alumina and/or magnesia octahedra. These materials are disclosed in U.S. Pat. No. 5,015,334, which is hereby incorporated by this reference.

In yet another embodiment, the invention relates to a kit for enhancing the sizing and strength properties of a cellulosic fiber, comprising a) a self-emulsifiable isocyanate, and b) a coupling agent.

In another embodiment, the invention relates to a process for enhancing the strength or sizing properties of a cellulosic fiber, comprising contacting the fiber with a) a self-emulsifying isocyanate, and b) a coupling agent.

The process of the present invention has a number of advantages over the processes disclosed in the prior art. First, the sizing and strength properties of the fiber are enhanced when treated with the composition of the present invention. Second, a reduction in foam and deposit formation is observed when the self-emulsifiable isocyanate is used in combination with the coupling agent. Finally, the decrease in deposit formation further enhances the efficiency of the machinery required to process the cellulosic fiber.

The term "cellulosic fiber" includes but is not limited to wood, wood pulp, bagasse, straw, flax or alfa grass. The cellulosic fiber or cellulosic fiber pulp can also be used to make articles such as paper or paperboard.

The contacting step of the present invention can be but is not limited to admixing, mixing, spraying, coating, washing or dipping. In the present invention, the preferred mode of contacting the fiber with the composition is by admixing. Admixing is defined as combining the composition of the present invention with the cellulosic fiber and mixing the components together by way of agitation (i.e. stirring). The admixing process of the present invention preferably mixes the composition with the cellulosic fiber, wherein the composition is uniformly dispersed throughout the cellulosic fiber.

A general procedure for contacting the cellulosic fiber with composition of the present invention is as follows. The cellulosic fiber is preferably first mixed with water to achieve a consistency of 0.2 to 15 weight %, preferably 0.3 to 5 weight %, and even more preferably 0.5 to 1 weight % fiber. The aqueous fiber stock is mixed for 30 to 180 seconds, preferably 10 to 60 seconds in order to insure the fibers are adequately distributed in the water.

The self-emulsifiable isocyanate and coupling agent can be added simultaneously or in any sequential order to the aqueous fiber with agitation without adverse consequences to the effectiveness of the invention. If added consecutively, the coupling agent is preferably added within about 3 seconds after the addition of the self-emulsifiable isocyanate in order to prevent or slow down the reaction between water and the self-emulsifiable isocyanate.

In one embodiment, the self-emulsifiable isocyanate is from 0.01 to 5, more preferably from 0.02 to 2, even more preferably from 0.05 to 0.25 parts by weight, the coupling agent is from 0.0025 to 4, 0.005 to 2, or 0.005 to 0.75 parts by weight, and the fiber is from 75 to 99.5 parts by weight. All weights are based on the dry weight of fiber.

The amount of coupling agent can vary widely depending upon the specific coupling agent used. In one embodiment, the cationic starch is from 0.01 to 4, preferably 0.12 to 2, and even more preferably 0.25 to 0.75 parts by weight. In another embodiment, the swelling clay is from 0.025 to 4, preferably 0.05 to 1, and even more preferably 0.1 to 0.5 parts by weight. In another embodiment, the cationic polymer or high molecular weight acrylic polymer is from 0.005 to 0.25, preferably from 0.01 to 0.15, and even more preferably 0.015 to 0.10 parts by weight. In another embodiment, the polyamine is from 0.005 to 0.5, preferably from 0.01 to 0.35, and even more preferably from 0.15 to 0.25 parts by weight. In another embodiment, the polyethyleneimine is from 0.025 to 0.75, preferably from 0.05 to 0.5, and even more preferably from 0.075 to 0.4 parts by weight. In another embodiment, the nonionic polymer comprising monomeric units of ethylene oxide is from 0.0025 to 0.05, preferably from 0.005 to 0.025, and even more preferably from 0.005 to 0.02 parts by weight. All parts by weight above are based on 75 to 99.5 parts by weight dry fiber.

Other additives, fillers, diluents, solvents, etc. known in the fiber art can be added to the mixture.

The paper stock, self-emulsifiable isocyanate, and coupling agent are mixed from greater than zero seconds to five minutes, preferably 10 to 120 seconds, more preferably 30 seconds. The agitator is then turned off and the container holding the aqueous fiber, self-emulsifiable isocyanate and coupling agent is allowed to gravity drain until the flow of water is stopped. Vacuum can be applied below the wire section to complete the drainage process. The wet sheet is then removed from the container and pressed against a blotter to remove additional water. The sheet is then removed from the blotter and placed on a speed dryer at 125 to 175° C., preferably 135 to 165° C., more preferably 150° C., until dry. The dried sheet is stored for at least 24 hours at standard conditions to equilibrate before testing.

In yet another embodiment, the invention relates to products made from the process disclosed herein.

In yet another embodiment, the invention relates to a modified cellulosic fiber, wherein the self-emulsifiable isocyanate and coupling agent are incorporated into the cellulosic fiber. Not to be bound by theory, it is believed that the self-emulsifiable isocyanate reacts with the cellulosic fiber, particularly with the lignin on the fiber, which is herein defined as a component of the cellulosic fiber, and/or the coupling agent to produce the modified cellulosic fiber. The resulting modified cellulosic fiber has the self-emulsifiable isocyanate and the coupling agent incorporated into the fiber network of the fiber and not just on the surface of the fiber.

The present invention is more particularly described in the following examples which are intended as illustrative only since numerous modifications and variations therein will be apparent to those skilled in the art.

EXPERIMENTAL

The following examples are put forth so to provide those of ordinary skill in the art with a complete disclosure and description of how the compositions and products claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in °C. or is at or near room temperature and pressure is at or near atmospheric. The following reactants were used to prepare the compositions disclosed in Examples 1–9:

1) RUBINATE® M is a non-emulsifying polyisocyanate, which is composed of 100% by weight polymeric diphenylmethane diisocyanate (polymeric MDI), and is supplied by ICI Americas, Inc.

2) RUBINATE® 1780 is a self-emulsifiable polyisocyanate, which is composed of 90–100% by weight polymeric diphenylmethane diisocyanate (polymeric MDI) and 1–5% by weight modified polymeric MDI, and is supplied by ICI Americas Inc.

3) PROSET® 5830 is a highly crosslinked dimethylamine epichlorohydrin polymer supplied by Vinings Industries, Inc., Atlanta, Ga., USA.

4) PROSORB® A and PROSORB® R are montmorillonite clay slurries covered under U.S. Pat. No. 5,407,480 as supplied by Vinings Industries, Inc., Atlanta, Ga., USA.

5) STALOK® 400 is a cationic starch, which is the reaction product of potato starch and a cationic quarternized monomer, and is supplied by A. E. Staley Manufacturing Company.

6) PROFLOC® 1607 is a dry cationic polyacrylamide polymer with less than 10 mole % cationic monomer, which is supplied by Vinings Industries, Inc., Atlanta, Ga., USA.

7) The polyethyleneimine used has a molecular weight of 8,000,000, and is supplied by BASF as POLYMIN® SKA.

8) The polyethylene oxide has a molecular weight of approximately 80,000,000 and is supplied by Kemira as NETFLOC® FRA.

EXAMPLE 1

A sample of thick stock was obtained from a large 100% recycled fiber paper mill in the southern United States, which manufactures linerboard and corrugating medium paperboard. This mill is concerned with the strength characteristic of their finished paper because recycled fiber is substantially weaker than virgin fiber.

Handsheets were prepared using a Dynamic Drainage Jar, modified in the following manner. The jar was 8 inches in diameter and was equipped with baffles to enhance mixing. The jar was equipped with a stirring motor and an agitator to mix the stock. All tests were conducted using the same amount of time and shear to evaluate treatment regimes. A section of a fourdrinier forming fabric was used as the drainage element to better simulate paper machine conditions. The jar can be drained by gravity alone or can be vacuum assisted. All sheets were made to a constant basis weight of 69 lb/1000 ft$^2$ (337 g/m$^2$), a common basis weight for both high strength linerboard and for making paper cores.

Thick stock from the mill was constantly agitated to keep it uniformly dispersed and the consistency was carefully determined. This untreated stock was weighed into a beaker and mixed with the appropriate amount of water to achieve a consistency of 0.5% fiber. This diluted stock was poured into the jar and mixed for 30 seconds prior to the addition of any additive to insure the fiber was adequately distributed in the water. The sample of isocyanate (non- or self-emulsifiable) was added with agitation. After the isocyanate was added to aqueous fiber admixture, the coupling agent was immediately added (within 3 seconds) to the admixture and mixed for a total of 30 seconds. The agitator was then turned off, and 5 seconds was allowed to elapse before the jar was drained by gravity until the flow of water stopped. Vacuum was then applied below the wire section to complete the drainage process. The forming fabric with the wet sheet was then removed from the jar and pressed against a blotter to remove additional water. The sheet was then removed from the blotter and placed on a speed dryer at 140° C. until dry. The dried sheet was stored for at least 24 hours at standard conditions to equilibrate before testing.

Five sheets were prepared at each dosage to insure the significance of the data.

Strength measurements were made with an Instron tester to measure tensile strength and a Mullen tester to test burst strength. Wet strength tests were measured analogously, but after immersion of the sheets in water for a specified time. Sizing tests were conducted using a water drop test, which measures the time required for 5 microliters of water to completely penetrate into the surface of the sheet, which is a common test for linerboard manufacturers.

Table 1 contains the data from a laboratory study using a non-emulsifiable isocyanate, Rubinate® M, supplied by ICI Americas, both with and without a cationic polymer in a recycled linerboard furnish. It shows that the non-emulsifiable isocyanate alone produces a small increase in tensile strength as compared to untreated samples. Burst strength was slightly decreased, except at high dosages. Sizing efficiency was dramatically improved.

The coupling agent, polyquaternary amine, when used alone, produced a small decrease in tensile strength, while burst strength remained unchanged.

However, the combination of polyquaternary amine coupling agent with the non-emulsifiable isocyanate produced significant increases in both tensile and burst strength. The sizing impact of the paper could not be measured when a non-emulsifiable isocyanate in combination with the coupling agent was used because the second part of the study was conducted with corrugating medium stock, which contains the same fiber mix and has the same strength properties as linerboard stock from this mill. Corrugating medium has a wetting agent added to prevent sizing, which does not interfere with strength. This demonstrates that external emulsifiers prevent the development of sizing, despite the presence of a coupling agent.

EXAMPLE 2

Experimental work was conducted using the same test method as in Example 1, and the results are summarized in Table 2. The self-emulsifiable isocyanate RUBINATE® 1780, which is supplied by ICI Americas, was used both alone and in conjunction with a polyquaternary amine. The self-emulsifiable isocyanate alone produced an extremely large positive effect on size, while tensile strength was improved slightly at lower dosages. Burst strength was negatively impacted at all but the lowest dosage. The coupling agent polymer when used alone showed a slight decrease in tensile strength and left burst virtually unchanged.

The combination of polyquaternary amine coupling agent and self-emulsifiable isocyanate produced significantly better results in both tensile strength and burst strength than either component alone. Sizing efficiency was not measurable for the same reason as Example 1, which demonstrates that an external emulsifier decreases the sizing properties of the paper when applied in combination with a self-emulsifying isocyanate despite the presence of a coupling agent.

TABLE 1

| First Additive | Dosage Wt. % Dry Fiber | Second Additive | Dosage Wt. % Dry Fiber | Tensile Avg. (kgf/cm) | Mullen Avg. (lb/in$^2$) | Water Drop Avg. (seconds) | Change in Tensile (kgf/cm) | Change in Mullen (lb/in$^2$) | Change in Water Drop (seconds) |
|---|---|---|---|---|---|---|---|---|---|
| Blank | 0.00% | None | 0.00% | 117.1 | 99.6 | 173.3 | 0.0 | 0.0 | 0.0 |
| Proset 5830 | 0.05% | None | 0.00% | 109.6 | 100.0 | 211.1 | −7.5 | 0.4 | 37.8 |
| Proset 5830 | 0.10% | None | 0.00% | 109.9 | 97.8 | 324.0 | −7.2 | −1.8 | 150.7 |
| Rubinate M | 0.10% | None | 0.00% | 111.7 | 84.3 | 1920.0 | −5.4 | −15.3 | 1746.7 |
| Rubinate M | 0.25% | None | 0.00% | 124.0 | 93.1 | 1858.0 | 6.9 | −6.5 | 1684.7 |
| Rubinate M | 0.50% | None | 0.00% | 118.1 | 90.0 | 2005.0 | 1.0 | −9.6 | 1831.7 |
| Rubinate M | 0.75% | None | 0.00% | 126.0 | 94.4 | 2053.0 | 8.9 | −5.2 | 1879.7 |
| Rubinate M | 1.00% | None | 0.00% | 126.2 | 100.2 | 1945.0 | 9.1 | 0.6 | 1771.7 |
| Rubinate M | 2.00% | None | 0.00% | 118.8 | 105.2 | 2209.0 | 1.7 | 5.6 | 2035.7 |
| Rubinate M | 0.25% | Proset 5830 | 0.05% | 123.8 | 109.2 | 8.3 | 6.7 | 9.6 | −3.1 |
| Rubinate M | 0.50% | Proset 5830 | 0.05% | 126.3 | 105.9 | 9.5 | 9.2 | 6.3 | −1.9 |
| Rubinate M | 0.75% | Proset 5830 | 0.05% | 124.9 | 106.6 | 9.6 | 7.8 | 7.0 | −1.8 |
| Rubinate M | 1.00% | Proset 5830 | 0.05% | 129.5 | 111.2 | 8.9 | 12.4 | 11.6 | −2.5 |
| Rubinate M | 0.25% | Proset 5830 | 0.10% | 130.6 | 117.7 | 7.4 | 13.5 | 18.1 | −4.0 |
| Rubinate M | 0.50% | Proset 5830 | 0.10% | 128.2 | 116.9 | 8.8 | 11.1 | 17.3 | −2.6 |
| Rubinate M | 0.75% | Proset 5830 | 0.10% | 125.8 | 111.9 | 8.6 | 8.7 | 12.3 | −2.8 |
| Rubinate M | 1.00% | Proset 5830 | 0.10% | 131.8 | 120.6 | 10.0 | 14.7 | 21.0 | −1.4 |

TABLE 2

| First Additive | Dosage Wt. % Dry Fiber | Second Additive | Dosage Wt. % Dry Fiber | Tensile Avg. (kgf/cm) | Mullen Avg. (lb/in$^2$) | Water Drop Avg. (seconds) | Change in Tensile (kgf/cm) | Change in Mullen (lb/in$^2$) | Change in Water Drop (seconds) |
|---|---|---|---|---|---|---|---|---|---|
| Blank | 0.00% | None | 0.00% | 117.1 | 99.6 | 173.3 | 0.0 | 0.0 | 0.0 |
| Proset 5830 | 0.05% | None | 0.00% | 109.6 | 100.0 | 211.1 | −7.5 | 0.4 | 37.8 |
| Proset 5830 | 0.10% | None | 0.00% | 109.9 | 97.8 | 324.0 | −7.2 | −1.8 | 150.7 |
| Rubinate 1780 | 0.10% | None | 0.00% | 119.5 | 106.1 | 2078.0 | 2.4 | 6.5 | 1904.7 |
| Rubinate 1780 | 0.25% | None | 0.00% | 127.5 | 99.1 | 2247.0 | 10.4 | −0.5 | 2073.7 |
| Rubinate 1780 | 0.50% | None | 0.00% | 117.2 | 96.9 | 2020.0 | 0.1 | −2.7 | 1846.7 |
| Rubinate 1780 | 0.75% | None | 0.00% | 125.3 | 94.8 | 2366.0 | 8.2 | −4.8 | 2192.7 |
| Rubinate 1780 | 1.00% | None | 0.00% | 117.2 | 94.7 | 2184.0 | 0.1 | −4.9 | 2010.7 |
| Rubinate 1780 | 2.00% | None | 0.00% | 118.4 | 91.1 | 2138.0 | 1.3 | −8.5 | 1964.7 |
| Rubinate 1780 | 0.25% | Proset 5830 | 0.05% | 124.6 | 113.1 | 9.1 | 7.5 | 13.5 | 0.8 |
| Rubinate 1780 | 0.50% | Proset 5830 | 0.05% | 131.6 | 116.9 | 8.6 | 14.5 | 17.3 | 0.3 |
| Rubinate 1780 | 0.75% | Proset 5830 | 0.05% | 132.5 | 112.5 | 10.5 | 15.4 | 12.9 | 2.2 |
| Rubinate 1780 | 1.00% | Proset 5830 | 0.05% | 136.7 | 123.7 | 9.3 | 19.6 | 24.1 | 1.0 |
| Rubinate 1780 | 0.25% | Proset 5830 | 0.10% | 124.4 | 118.1 | 7.6 | 7.3 | 18.5 | −0.7 |
| Rubinate 1780 | 0.50% | Proset 5830 | 0.10% | 129.6 | 115.2 | 9.1 | 12.5 | 15.6 | 0.8 |
| Rubinate 1780 | 0.75% | Proset 5830 | 0.10% | 133.9 | 121.7 | 8.1 | 16.8 | 22.1 | −0.2 |
| Rubinate 1780 | 1.00% | Proset 5830 | 0.10% | 135.2 | 130.5 | 9.3 | 18.1 | 30.9 | 1.0 |

EXAMPLE 3

The test protocol was the same as in Example 1. Data from the tests can be found in Table 3. Example 3 examined the sizing and strength properties of paper when a self-emulsifiable isocyanate in combination with a swelling clay was used. The self-emulsifiable isocyanate produced a remarkable effect on sizing when used alone, while tensile strength was improved slightly. Burst strength was negatively impacted at all but the lowest dosage. The swelling clay alone had a negative impact on sizing and a slight positive effect on tensile and burst strength at all but the lowest dosage. However, the combination provided a marked increase in both tensile and burst strength over the individual components.

EXAMPLE 4

The test method was the same as in Example 1 with the exception that a starch was cooked to solubilize it prior to the addition to the stock. The results are summarized in Table 4. The self-emulsifiable isocyanate produced a beneficial effect on sizing when used alone, while tensile strength was improved slightly. Burst strength was negatively impacted at all but the lowest dosage. However, the combination of the self-emulsifiable isocyanate with the cationic starch STALOK® 400, which is prepared by the combination of a potato starch with a quaternized cationic monomer, produced dramatic improvements in both tensile strength and burst strength, which was considerably higher than the performance of either component when used individually and not in combination.

TABLE 3

| First Additive | Dosage Wt. % Dry Fiber | Second Additive | Dosage Wt. % Dry Fiber | Tensile Avg. (kgf/cm) | Mullen Avg. (lb/in$^2$) | Water Drop Avg. (seconds) | Change in Tensile (kgf/cm) | Change in Mullen (lb/in$^2$) | Change in Water Drop (seconds) |
|---|---|---|---|---|---|---|---|---|---|
| Blank | 0.00% | None | 0.00% | 117.09 | 99.59 | 173.30 | 0.0 | 0.0 | 0.0 |
| PROSORB R | 0.25% | None | 0.00% | 117.20 | 96.07 | 101.10 | 0.1 | −3.5 | −72.2 |
| PROSORB R | 0.50% | None | 0.00% | 125.92 | 103.73 | 81.42 | 8.8 | 4.1 | −91.9 |
| PROSORB R | 0.75% | None | 0.00% | 125.13 | 101.60 | 136.50 | 8.0 | 2.0 | −36.8 |
| Rubinate 1780 | 0.10% | None | 0.00% | 119.50 | 106.10 | 2078.00 | 2.4 | 6.5 | 1904.7 |
| Rubinate 1780 | 0.25% | None | 0.00% | 127.50 | 99.10 | 2247.00 | 10.4 | −0.5 | 2073.7 |
| Rubinate 1780 | 0.50% | None | 0.00% | 117.20 | 96.90 | 2020.00 | 0.1 | −2.7 | 1846.7 |
| Rubinate 1780 | 0.75% | None | 0.00% | 125.30 | 94.80 | 2366.00 | 8.2 | −4.8 | 2192.7 |
| Rubinate 1780 | 1.00% | None | 0.00% | 117.20 | 94.70 | 2184.00 | 0.1 | −4.9 | 2010.7 |
| Rubinate 1780 | 2.00% | None | 0.00% | 118.40 | 91.10 | 2138.00 | 1.3 | −8.5 | 1964.7 |
| Rubinate 1780 | 0.25% | PROSORB A | 0.50% | 163.60 | 139.20 | | 46.5 | 39.6 | |
| Rubinate 1780 | 0.50% | PROSORB A | 0.50% | 158.00 | 135.90 | | 40.9 | 36.3 | |
| Rubinate 1780 | 0.75% | PROSORB A | 0.50% | 152.60 | 136.70 | | 35.5 | 37.1 | |
| Rubinate 1780 | 1.00% | PROSORB A | 0.50% | 160.20 | 139.70 | | 43.1 | 40.1 | |
| Rubinate 1780 | 0.25% | PROSORB A | 0.75% | 162.20 | 138.50 | | 45.1 | 38.9 | |
| Rubinate 1780 | 0.50% | PROSORB A | 0.75% | 165.90 | 137.40 | | 48.8 | 37.8 | |
| Rubinate 1780 | 0.75% | PROSORB A | 0.75% | 159.20 | 143.90 | | 42.1 | 44.3 | |
| Rubinate 1780 | 1.00% | PROSORB A | 0.75% | 157.20 | 138.30 | | 40.1 | 38.7 | |

TABLE 4

| First Additive | Dosage Wt. % Dry Fiber | Second Additive | Dosage Wt. % Dry Fiber | Tensile Avg. (kgf/cm) | Mullen Avg. (lb/in$^2$) | Water Drop Avg. (seconds) | Change in Tensile (kgf/cm) | Change in Mullen (ln/in$^2$) | Change in Water Drop (seconds) |
|---|---|---|---|---|---|---|---|---|---|
| Blank | 0.00% | None | 0.00% | 117.09 | 99.59 | 173.30 | 0.0 | 0.0 | 0.0 |
| Rubinate 1780 | 0.10% | None | 0.00% | 119.5 | 106.1 | 2078.0 | 2.4 | 6.5 | 1904.7 |
| Rubinate 1780 | 0.25% | None | 0.00% | 127.5 | 99.1 | 2247.0 | 10.4 | −0.5 | 2073.7 |
| Rubinate 1780 | 0.50% | None | 0.00% | 117.2 | 96.9 | 2020.0 | 0.1 | −2.7 | 1846.7 |
| Rubinate 1780 | 0.75% | None | 0.00% | 125.3 | 94.8 | 2366.0 | 8.2 | −4.8 | 2192.7 |
| Rubinate 1780 | 1.00% | None | 0.00% | 117.2 | 94.7 | 2184.0 | 0.1 | −4.9 | 2010.7 |
| Rubinate 1780 | 2.00% | None | 0.00% | 118.4 | 91.1 | 2138.0 | 1.3 | −8.5 | 1964.7 |
| Stalok 400 | 0.25% | None | 0.00% | 130.0 | 88.6 | 353.2 | 12.9 | −11.0 | 179.9 |
| Stalok 400 | 0.50% | None | 0.00% | 134.2 | 96.3 | 920.5 | 17.1 | −3.3 | 747.2 |
| Stalok 400 | 0.75% | None | 0.00% | 127.9 | 82.4 | 2376.7 | 10.8 | −17.2 | 2203.4 |
| Rubinate 1780 | 0.25% | Stalok 400 | 0.50% | 166.4 | 143.9 | | 49.3 | 44.3 | |
| Rubinate 1780 | 0.50% | Stalok 400 | 0.50% | 173.6 | 148.0 | | 56.5 | 48.4 | |
| Rubinate 1780 | 0.75% | Stalok 400 | 0.50% | 175.1 | 147.2 | | 58.0 | 47.6 | |
| Rubinate 1780 | 1.00% | Stalok 400 | 0.50% | 182.2 | 151.5 | | 65.1 | 51.9 | |
| Rubinate 1780 | 0.25% | Stalok 400 | 0.75% | 186.8 | 149.4 | | 69.7 | 49.8 | |
| Rubinate 1780 | 0.50% | Stalok 400 | 0.75% | 183.9 | 155.1 | | 66.8 | 55.5 | |
| Rubinate 1780 | 0.75% | Stalok 400 | 0.75% | 189.7 | 161.2 | | 72.6 | 61.6 | |
| Rubinate 1780 | 1.00% | Stalok 400 | 0.75% | 207.5 | 167.0 | | 90.4 | 67.4 | |

EXAMPLE 5

A series of tests were conducted on a pilot paper machine to determine the strength characteristic of paper manufactured with self-emulsifiable isocyanates when used in combination with the laboratory proven coupling agents, such as smectite clay and cationic starch. Recycled unbleached box clippings were used as the source of fiber. Sheet basis weight was 69 lb/1000 ft$^2$ (0.34 kg/m$^2$). The machine was run at pH 6 with no alum and the speed was 15 ft/min. A self-emulsifiable isocyanate was used as the base strength additive. The data on Mullen burst strength generated on sheets from the trial are listed in Table 5.

TABLE 5

| | Mullen Burst Strength (lb/in$^2$) | | | |
|---|---|---|---|---|
| | PROSORB ® A @ 0.50% | STALOK ® 400 @ 0.375% | STALOK ® 400 @ 0.75% | None |
| RUBINATE ® 1780 @ 0.25% | 155 | 142 | — | 143 |
| RUBINATE ® 1780 @ 0.50% | 147 | — | 139 | 126 |
| Control | — | — | — | 114 |

The data shows improved performance when the self-emulsifiable isocyanate was used in combination with a smectite clay slurry and a cationic starch. The paper machine ran with very little foam. A small amount of deposit formed on the last roll in the press section, which was rubber coated, when no coupling agent was in use. No deposits were noted when the cationic starch or smectite clay slurry were used.

EXAMPLE 6

Another trial was conducted using the same protocol as in Example 5; however, a non-emulsifiable isocyanate was used for these tests in combination with laboratory proven coupling agents. The data on Mullen burst strength generated on sheets from the trial are listed in the following table.

TABLE 6

| | Mullen Burst Strength (lb/in$^2$) | | | |
|---|---|---|---|---|
| | PROSORB ® A ® @ 0.75% | STALOK ® 400 @ 0.50% | STALOK ® 400 @ 0.75% | None |
| RUBINATE ® M @ 0.25% | 126 | 132 | — | 117 |
| RUBINATE ® M @ 0.50% | 129 | — | 129 | 120 |
| Control | — | — | — | 114 |

The data shows that a non-emulsifiable isocyanate was not effective in increasing the strength of the board when used alone. Although strength was enhanced when a cationic starch and a swelling clay were used in combination with the non-emulsifiable isocyanate, the increase in strength was not as high as compared to the use of a self-emulsifiable isocyanate in combination with a coupling agent. Furthermore, the formation of foam in the forming section of the paper machine was excessive. A heavy build-up of deposit was noted on the last roll in the press section, which was rubber coated with the polyisocyanate only. A small amount of deposition was noted when the cationic starch or smectite was in use.

EXAMPLE 7

Another trial was conducted on the same pilot paper machine as in Example 5, but with the following exceptions. Basis weight was decreased to 42 lb/1000 ft$^2$ (0.205 kg/m$^2$) and machine speed was increased to 24 ft/min (0.12 m/s). A self-emulsifiable isocyanate was used. The following sizing study, using the water drop test data, was obtained from paper manufactured under the following conditions. The data, in Table 7, is in seconds for the complete penetration of 5 microliter of water into the surface of the sheet.

TABLE 7

| | Mullen Burst Strength (lb/in$^2$) | | | |
|---|---|---|---|---|
| | STALOK® 400 @ 0.5% | PROSORB® A @ 0.50% | PROSORB® A @ 0.5% STALOK® 400 @ 0.5% | None |
| Blank | | | | 422 |
| RUBINATE® 1780 @ 0.25% | 1999 | | 2248 | |
| RUBINATE® 1780 @ 0.50% | 2475 | 2057 | | 1982 |

This example shows there is an advantage in sizing performance when cationic starch and smectite clay are used in combination with a self-emulsifiable isocyanate. No deposits were noted on the rubber roll at the exit of the press section.

EXAMPLE 8

A sample of paper prepared in Example 7 was cut into strips in order to conduct testing on the wet-strength of the paper. The test strip was cut both in the machine direction and the cross machine direction and was immersed in water for 30 minutes prior to testing. The data from the experiment is found in Table 8. Paper samples manufactured without any coupling agent had lost most of their strength due to absorption of water in the sheet disrupting hydrogen bonding that gives dry paper its strength. The addition of the self-emulsifiable isocyanate alone increases the wet strength. Addition of a cationic starch and swelling clay enhances the effect.

EXAMPLE 9

Experimental work was conducted in accordance with the methods used in Example 1. The object of the work was to determine whether polymeric materials suitable for enhancing retention are effective as coupling agents for self-emulsifiable isocyanates. The self-emulsifiable isocyanate alone increased the tensile strength and Mullen burst strength. Cationic polyacrylamide and polyethylene oxide show a marked tendency to decrease strength, while polyethyleneimine had a neutral to slight positive effect (Table 9). The water soluble acrylic polymer PROFLOC® 1607, which is a copolymer of acrylamide and dimethylaminoethyl acrylate, polyethyleneimine, and the nonionic polymer polyethylene oxide produced an increase in the strength properties of the board at low feed rates. These polymeric materials were suitable for use as coupling agents.

TABLE 8

| | | | | Machine Direction | | | Cross Machine Direction | | |
|---|---|---|---|---|---|---|---|---|---|
| First Additive | Dosage Wt % | Second Addtive | Dosage Wt % Dry Fiber | Wet Tensile Avg. (kgf/cm) | % of Dry Tensile | Extension (mm) | Wet Tensile Avg. (kgf/cm) | % of Dry Tesnile | Extension (mm) |
| Blank | 0.00% | None | 0.00% | 8.33 | 4.6% | 2.2 | 5.00 | 4.6% | 5.0 |
| Rubinate 1780 | 0.50% | Stalok 400 | 0.50% | 25.67 | 14.2% | 3.4 | 13.67 | 12.5% | 7.3 |
| Rubinate 1780 | 0.50% | PROSO RBA | 0.25% | 16.67 | 9.2% | 3.0 | 9.33 | 8.6% | 6.0 |
| Rubinate 1780 | 0.50% | None | 0.00% | 18.00 | 9.9% | 3.1 | 11.00 | 10.1% | 6.4 |
| Stalok 400 | 0.50% | None | 0.00% | 12.33 | 6.8% | 2.1 | 8.00 | 7.3% | 5.7 |

TABLE 9

| First Addition | Dosage wt. % | Second Addition | Dosage wt. % | Tensile Ave. (kgf/cm) | Mullen Ave. (lb/in$^2$) | Change in Tensile (kgf/cm) | Change in Mullen (lb/in$^2$) |
|---|---|---|---|---|---|---|---|
| Blank | 0.000% | None | 0.000% | 151.3 | 123.0 | 0.0 | 0.0 |
| Rubinate 1780 | 0.050% | None | 0.000% | 147.4 | 129.1 | -3.9 | 6.1 |
| Rubinate 1780 | 0.125% | None | 0.000% | 176.1 | 146.7 | 24.8 | 23.7 |
| Rubinate 1780 | 0.250% | None | 0.000% | 182.7 | 160.5 | 31.4 | 37.5 |
| Rubinate 1780 | 0.050% | PROFLOC 1607 | 0.025% | 169.2 | 140.6 | 17.9 | 17.6 |
| Rubinate 1780 | 0.125% | PROFLOC 1607 | 0.025% | 168.0 | 169.4 | 16.7 | 46.4 |

TABLE 9-continued

| First Addition | Dosage wt. % | Second Addition | Dosage wt. % | Tensile Ave. (kgf/cm) | Mullen Ave. (lb/in$^2$) | Change in Tensile (kgf/cm) | Change in Mullen (lb/in$^2$) |
|---|---|---|---|---|---|---|---|
| Rubinate 1780 | 0.050% | PROFLOC 1607 | 0.050% | 168.0 | 130.2 | 16.7 | 7.2 |
| Rubinate 1780 | 0.050% | Polyethyleneimine | 0.050% | 184.6 | 155.1 | 33.3 | 32.1 |
| Rubinate 1780 | 0.050% | Polyethyleneimine | 0.150% | 179.4 | 152.2 | 28.1 | 29.2 |
| Rubinate 1780 | 0.125% | Polyethyleneimine | 0.150% | 180.8 | 160.8 | 29.5 | 37.8 |
| Rubinate 1780 | 0.050% | Polyethyleneimine | 0.250% | 178.0 | 143.8 | 26.7 | 20.8 |
| Rubinate 1780 | 0.050% | Polyethylene oxide | 0.006% | 132.0 | 160.2 | −19.3 | 37.2 |
| None | 0.000% | PROFLOC 1607 | 0.025% | 138.1 | 114.3 | −13.2 | −8.7 |
| None | 0.000% | PROFLOC 1607 | 0.050% | 139.3 | 103.5 | −12.0 | −19.5 |
| None | 0.000% | Polyethyleneimine | 0.050% | 154.9 | 131.7 | 3.6 | 8.7 |
| None | 0.000% | Polyethyleneimine | 0.150% | 152.1 | 131.2 | 0.8 | 8.2 |
| None | 0.000% | Polyethyleneimine | 0.250% | 137.7 | 108.7 | −13.6 | −14.3 |
| None | 0.000% | Polyethylene oxide | 0.006% | 128.9 | 103.9 | −22.4 | −19.1 |

Throughout this application, various publications are referenced. The disclosures of these publications in their entireties are hereby incorporated by reference into this application in order to more fully describe the state of the art to which this invention pertains.

Although the present process has been described with reference to specific details of certain embodiments thereof, it is not intended that such details should be regarded as limitations upon the scope of the invention except as and to the extent that they are included in the accompanying claims.

What is claimed is:

1. A process for enhancing the strength or sizing properties of a cellulosic fiber, comprising contacting the fiber in an aqueous admixture with
   a) a self-emulsifiable isocyanate, and
   b) a coupling agent comprising a swelling clay or starch, wherein the addition of component (b) is within 3 seconds of the addition of component (a).

2. The process of claim 1, wherein after adding components (a) and (b) to the aqueous admixture, further adding a diluent to the aqueous admixture.

3. The process of claim 2, wherein the diluent is water.

4. The process of claim 3, wherein water is from greater than 0 to 10 parts by weight of of dry fiber.

5. The process of claim 1, wherein the cellulosic fiber is wood, wood pulp, bagasse, straw, flax or alfa grass.

6. The process of claim 1, wherein the self-emulsifying isocyanate comprises the reaction product between an isocyanate compound of a monoisocyanate, a polyisocyanate or a mixture thereof and an isocyanate-reactive compound, which reacts with the NCO moiety on the isocyanate compound, wherein the isocyanate reactive compound imparts self-emulsifiable properties in the isocyanate.

7. The process of claim 6, wherein the polyisocyanate is independently substituted with one or more aromatic, aliphatic, araliphatic, cycloaliphatic, heterocyclic, sulfonyl, carbodiimide, norbornyl, allophanate, isocyanurate, urethane, acylated urea, biuret, ester, acetal, or polymeric fatty acid ester moieties.

8. The process of claim 6, wherein the polyisocyanate is independently substituted with one or more aromatic, aliphatic or cycloaliphatic moieties.

9. The process of claim 6, wherein the self-emulsifiable isocyanate has at least one NCO moiety.

10. The process of claim 6, wherein the isocyanate compound has two NCO groups.

11. The process of claim 6, wherein the polyisocyanate comprises hexamethylene diisocyanate; m-phenylene diisocyanate; p-phenylene diisocyanate; tolylene-2,4-diisocyanate; tolylene-2,6-diisocyanate; 4,4'-diphenylmethanediisocyanate; chlorophenylene-2,4-diisocyanate; naphthylene-1,5-diisocyanate; diphenylene-4,4'-diisocyanate; 4,4'-diisocyanate-3,3'-dimethyldiphenyl; 3-methyldiphenylmethane-4,4'-diisocyanate; diphenyl ether diisocyanate; cyclohexane-2,4-diisocyanate; cyclohexane-2,3-diisocyanate; 1-methyl cyclohexyl-2,4-diisocyanate; 1-methyl cyclohexyl-2,6-diisocyanate; bis-(isocyanatocyclohexyl-)methane; 2,4,6-triisocyanatotoluene; 2,4,4'-triisocyanatediphenylether; 1-isocyanato-3,3,5-trimethyl-5-isocyanato-methylcyclohexane, 4,4'-diisocyanatodicyclohexyl methane; 4,4'-diisocyanatodicyclohexyl propane-(2,2); 1,4-diisocyanatobenzene; 4,4'-diisocyanatodiphenyl propane-(2,2); p-xylene diisocyanate; α,α,α',α'-tetramethyl-m- or p-xylylene diisocyanate or a mixture thereof.

12. The process of claim 6, wherein the polyisocyanate comprises a methylene bridged polyphenyl diisocyanate.

13. The process of claim 6, wherein the polyisocyanate is 4,4'-diphenylmethane diisocyanate.

14. The process of claim 6, wherein the isocyanate-reactive compound comprises a hydroxyl-capped polyester, a hydroxyl-capped polyether, a polyol, an amine, an amide, a thiol, a thioether or a mixture thereof.

15. The process of claim 14, wherein the polyol comprises ethylene glycol, trimethylol propane, butanediol or a mixture thereof.

16. The process of claim 15, wherein butanediol is 1,4-butanediol.

17. The process of claim 6, wherein the isocyanate-reactive compound has the formula $R^1O(CH_2CHR^2O)_nH$, wherein $R^1$ and $R^2$ are independently hydrogen or branched or straight chain $C_1$–$C_4$ and n is from 5 to 120.

18. The process of claim 17, wherein $R^1$ is methyl, ethyl, propyl or butyl, $R^2$ is hydrogen, methyl or ethyl, and n is from 10 to 25.

19. The process of claim 17, wherein $R^1$ and $R^2$ are methyl.

20. The process of claim 17, wherein the molecular weight of the isocyanate-reactive compound is from 300 to 1000.

21. The process of claim 17, wherein the molecular weight of the isocyanate-reactive compound is from 500 to 750.

22. The process of claim 6, wherein the isocyanate-reactive compound is a polyether glycol.

23. The process of claim 6, wherein the isocyanate-reactive compound is monomethylether of propylene glycol.

24. The process of claim 1, wherein the self-emulsifying isocyanate comprises the reaction product between a methylene bridged polyphenyl diisocyanate and a polyether glycol.

25. The process of claim 1, wherein the self-emulsifying isocyanate comprises the reaction product between 4,4'-methylenediphenyldiisocyanate and monomethylether of propylene glycol.

26. The process of claim 1, wherein the coupling agent comprises a starch.

27. The process of claim 1, wherein the coupling agent comprises a swelling clay.

28. The process of claim 1, wherein the coupling agent comprises a starch, wherein the starch comprises a cationic starch.

29. The process of claim 28, wherein the cationic starch comprises the reaction product of a cationic monomer and a starch.

30. The process of claim 29, wherein the cationic monomer is 2-dimethylaminoethyl chloride, 2-diethylamino chloride, N-2,3-(epoxy)-propyl diethylamine or mixtures thereof.

31. The process of claim 29, wherein the starch is corn, wheat, potato, rice, tapioca or a mixture thereof.

32. The process of claim 28, wherein the cationic starch is the reaction product between potato starch and cationic quarternized monomer.

33. The process of claim 1, wherein the coupling agent comprises a swelling clay, wherein the swelling clay comprises a smectite-type clay, a synthetic smectite-type clay, synthetic hectorite-type clay or a mixture thereof.

34. The process of claim 33, wherein the swelling clay comprises a colloidal swelling clay.

35. The process of claim 34, wherein the colloidal swelling clay comprises montmorillonite, bentonite, sodium bentonite, beidellite, nontronite, saponite, hectorite, sauconite or a mixture thereof.

36. The process of claim 33, wherein the swelling clay comprises montmorillonite, bentonite, sodium bentonite, beidellite, nontronite, saponite, hectorite, sauconite or a mixture thereof.

37. The process of claim 1, wherein component (a) is from 0.01 to 5 parts by weight of dry fiber and component (b) is from 0.0025 to 4 parts by weight of dry fiber.

38. The process of claim 1, wherein component (a) is from 0.05 to 0.25 parts by weight of dry fiber and component (b) is from 0.005 to 0.75 parts by weight of dry fiber.

39. The process of claim 1, consisting essentially of components (a) and (b).

40. The process of claim 1, wherein the cellulosic fiber is pulp used to make paper or paperboard.

41. The process of claim 1, wherein prior to contacting, adding the cellulosic fiber to water to form an aqueous admixture of the cellulosic fiber.

42. The process of claim 41, wherein components (a) and (b) are added simultaneously to an aqueous admixture of the cellulosic fiber.

43. The process of claim 41, wherein component (a) is added first to an aqueous admixture of the cellulosic fiber, and then component (b) is added to the aqueous admixture of the cellulosic fiber.

44. The process of claim 41, wherein component (b) is added first to an aqueous admixture of the cellulosic fiber, and then component (a) is added to the aqueous admixture of the cellulosic fiber.

45. The process of claim 41, wherein the aqueous admixture comprising the cellulosic fiber and components (a) and (b) is further mixed from greater than zero seconds to five minutes.

46. The process of claim 41, wherein after the contacting step, the water is removed from the cellulosic fiber.

47. The process of claim 1, wherein the contacting comprises admixing.

* * * * *